(12) United States Patent
Bourquin et al.

(10) Patent No.: US 11,910,097 B2
(45) Date of Patent: Feb. 20, 2024

(54) SYSTEM FOR PERFORMING IMAGE MOTION COMPENSATION

(71) Applicant: KONINKLIJKE PHILIPS N.V., Eindhoven (NL)

(72) Inventors: Yannyk Parulian Julian Bourquin, Eindhoven (NL); Jonathan Alambra Palero, Waalre (NL); Erik Gosuinus Petrus Schuijers, Breda (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 17/771,511

(22) PCT Filed: Oct. 28, 2020

(86) PCT No.: PCT/EP2020/080213
§ 371 (c)(1),
(2) Date: Apr. 25, 2022

(87) PCT Pub. No.: WO2021/089372
PCT Pub. Date: May 14, 2021

(65) Prior Publication Data
US 2022/0385799 A1    Dec. 1, 2022

(30) Foreign Application Priority Data

Nov. 6, 2019  (EP) .................................... 19207436

(51) Int. Cl.
*H04N 23/72* (2023.01)
*H04N 23/56* (2023.01)

(52) U.S. Cl.
CPC ............. *H04N 23/72* (2023.01); *H04N 23/56* (2023.01)

(58) Field of Classification Search
CPC ........ H04N 23/72; H04N 23/56; H04N 23/12; H04N 23/6811; H04N 23/683; H04N 23/689; H04N 23/74; H04N 25/534
See application file for complete search history.

(56) References Cited

U.S. PATENT DOCUMENTS 5,523,786 A    6/1996  Parulski
2005/0276441 A1  12/2005  Debevec
(Continued)

FOREIGN PATENT DOCUMENTS

WO    2018057753 A1    3/2018

OTHER PUBLICATIONS

International Search Report and Written Opinion dated Feb. 1, 2021 for International Application No. PCT/EP2020/080213 Filed Oct. 28, 2020.
(Continued)

*Primary Examiner* — Twyler L Haskins
*Assistant Examiner* — Angel L Garces-Rivera (57) ABSTRACT

There is provided a system (100) for performing image motion compensation. The system comprises a light source (110), an imaging unit (120), and a control unit (130). The light source is configured to provide multiplexed illumination to an object in a plurality of color channels, the imaging unit is configured to capture a first image and a second image of the object in the plurality of color channels, and the control unit is configured to determine an estimated motion of pixels between the first image and the second image in a first color channel, and to generate a first motion compensated image by extrapolating the estimated motion of pixels between the first image and the second image to at least another one of the plurality of color channels.

20 Claims, 3 Drawing Sheets

(56) References Cited

U.S. PATENT DOCUMENTS

2007/0229533 A1  10/2007 Dalal
2015/0130958 A1   5/2015 Pavani
2017/0041575 A1   2/2017 Chen
2017/0094253 A1   3/2017 Matthews
2017/0354013 A1  12/2017 Demayo

OTHER PUBLICATIONS

Steiner, et al: "Design of an Active Multispectral SWIR Camera System for Skin Detection and Face Verification", Journal of Sensors, vol. 2016, Jan. 1, 2016.
International Preliminary Report on Patentability dated Apr. 29, 2021 for International Application No. PCT/EP2020/080213 Filed Oct. 28, 2020.
Gunnar Farnebäck, "Two-Frame Motion Estimation Based on Polynomial Expansion", SCIA 2003, Gothenburg, Sweden, Proceedings of the 13th Scandinavian Conference on Image Analysis, pp. 363-370, Jun.-Jul. 2003.

SYSTEM FOR PERFORMING IMAGE MOTION COMPENSATION

CROSS REFERENCE TO RELATED APPLICATIONS

This application is the U.S. National Phase application under 35 U.S.C. § 371 of International Application No. PCT/EP2020/080213 filed Oct. 28, 2020, which claims the benefit of European Patent Application Number 19207436.7 filed Nov. 6, 2019. These applications are hereby incorporated by reference herein.

FIELD OF THE INVENTION

The present disclosure relates to systems and methods for performing image motion compensation.

BACKGROUND OF THE INVENTION

There has been an increasing demand for non-obtrusive measurement and monitoring devices in the field of personal care and health application, particularly in skin sensing. Current available skin measurement systems provide skin quantification and skin feature monitoring functions that offer consumers information that may be too small to detect, too faint to notice, or too slow to follow. In order for these types of systems to be deemed usable by normal consumers, the embedded sensing functions should be sensitive as well as specific. In addition, the robustness of the relevant measurements is also essential in order to build consumer trust.

A critical issue in such imaging measurement systems is that when they are used in an uncontrolled environment, e.g. at home, there are typically inconsistencies in measurement due to undefined and potentially varying ambient lighting. One way to minimize the undesired effect of ambient light is to provide a known artificial light source that is significantly stronger than the ambient light. In this case, the artificial light effectively masks the ambient light. However, especially in sunny outdoor conditions, the brightness of the artificial light could be rendered impractical.

SUMMARY OF THE INVENTION

An alternative way to minimize the effect of ambient light is to compare an image shot with both artificial light and ambient light with an image shot only with ambient light. Subtracting the two images will provide a resultant image that is virtually free from the ambient light and is accordingly highly reproducible. However, one of the disadvantages associated with this method of generating reproducible images is that image subtraction techniques are highly sensitive to subject motion, especially at the edges of the photographed objects. Thus, it is desirable to perform appropriate motion compensation prior to the subtraction operation of the images. However, existing motion estimation algorithms. e.g. optical flow algorithm, are not sufficiently robust with respect to large intensity changes. It would therefore be advantageous to provide an improved system for performing image motion compensation, and a method for performing image motion compensation.

To better address one or more of the concerns mentioned earlier, in a first aspect, a system for performing image motion compensation is provided. The system comprises: a light source configured to provide multiplexed illumination to an object in a plurality of color channels, wherein the multiplexed illumination is provided such that at least one of the plurality of channels is used at a time; an imaging unit configured to capture a first image and a second image of the object in the plurality of color channels, wherein the first image is captured at a first point of time during which the illumination is provided in at least a first color channel, and the second image is captured at a second point of time during which the illumination is provided in at least the first color channel; and a control unit configured to: determine an estimated motion of pixels between the first image and the second image in the first color channel; and generate a first motion compensated image by extrapolating the estimated motion of pixels between the first image and the second image to at least another one of the plurality of color channels.

In some embodiments, during the first point of time the illumination may be provided in the first color channel and the second color channel, and during the second point of time the illumination may be not provided in the second color channel. In these embodiments, the control unit may be configured to: generate the first motion compensated image by extrapolating the estimated motion of pixels between the first image and the second image in the first color channel to the second color channel, and perform ambient light correction based on a difference between the first image and the first motion compensated image in the second color channel.

Furthermore, during the second point of time the illumination may be provided in a third color channel. In these embodiments, the imaging unit may be further configured to capture a third image during a third point of time during which the illumination is provided in the third color channel and not provided in the first color channel, and the control unit may be further configured to: determine an estimated motion of pixels between the second image and the third image in the third color channel, generate a second motion compensated image by extrapolating the estimated motion of pixels between the second image and the third image in the third color channel to the first color channel, and perform ambient light correction based on a difference between the second image and the third image in the first color channel.

In some embodiments, the imaging unit may be a rolling shutter camera, and the control unit may be configured to determine an estimated motion of pixels between the first image and the second image in the first color channel based on a first section in the first image and a corresponding second section in the second image. In these embodiments, the first and second sections may correspond to an overlap of illumination in the first color channel. Furthermore, the control unit may be further configured to perform ambient light correction in a third section in the first image and a corresponding fourth section in the first motion compensated image in a second color channel based on a difference between the third and fourth sections. In these embodiments, the third section and the fourth section may correspond to an area in which illumination in the second color channel does not overlap.

In some embodiments, the control unit may be configured to determine an estimated motion of pixels between the first image and the second image in the first color channel by generating a motion map indicating displacement of one or more pixels in the second image compared to the first image in the first color channel, and to generate the first motion compensated image by extrapolating the motion map to the corresponding one or more pixels in the second image in the at least one of the plurality of color channels. In these embodiments, generating the motion map may comprise tracking displacement of one or more pixels between the first image and the second image using a motion estimation algorithm.

In some embodiments, the bandwidth associated with each of the plurality of color channels may be within a respective predetermined range.

In some embodiments, the light source may be configured to provide multiplexed illumination in RGB, and the imaging unit is a RGB sensor.

In a second aspect, there is provided a method for performing image motion compensation. The method comprising: providing multiplexed illumination to an object in a plurality of color channels, wherein the multiplexed illumination is provided such that at least one of the plurality of channels is used at a time; capturing a first image and a second image of the object in the plurality of color channels, wherein the first image is captured at a first point of time during which the illumination is provided in at least a first color channel, and the second image is captured at a second point of time during which the illumination is provided in at least the first color channel; determining an estimated motion of pixels between the first image and the second image in the first color channel; and generating a first motion compensated image by extrapolating the estimated motion of pixels between the first image and the second image to at least another one of the plurality of color channels.

In some embodiments, during the first point of time the illumination may be provided in the first color channel and a second color channel, and during the second point of time the illumination is not provided in the second color channel. In these embodiments, generating the first motion compensated image comprises extrapolating the estimated motion of pixels between the first image and the second image in the first color channel to the second color channel. Furthermore, the method may further comprise performing ambient light correction based on a difference between the first image and the first motion compensated image in the second color channel.

Moreover, in some embodiments, during the second point of time the illumination may be provided in a third color channel, and the method may further comprise: capturing a third image during a third point of time during which the illumination is provided in the third color channel and not provided in the first color channel; determining an estimated motion of pixels between the second image and the third image in the third color channel; generating a second motion compensated image by extrapolating the estimated motion of pixels between the second image and the third image in the third color channel to the first color channel; and performing ambient light correction based on a difference between the second image and the third image in the first color channel.

In some embodiments, determining an estimated motion of pixels between the first image and the second image in the first color channel may be based on a first section in the first image and a corresponding second section in the second image. The first and second sections may correspond to an overlap of illumination in the first color channel.

In some embodiments, the method may further comprise performing ambient light correction in a third section in the first image and a corresponding fourth section in the first motion compensated image in a second color channel based on a difference between the third and fourth sections. In these embodiments, the third section and the fourth section may correspond to an area in which illumination in the second color channel does not overlap.

In some embodiments, determining an estimated motion of pixels between the first image and the second image in the first color channel may comprise generating a motion map indicating displacement of one or more pixels in the second image compared to the first image in the first color channel, and generating the first motion compensated image may comprise extrapolating the motion map to the corresponding one or more pixels in the second image in the at least one of the plurality of color channels.

According to the aspects and embodiments described above, the limitations of existing techniques are addressed. In particular, the above-described aspects and embodiments offer robust motion compensation techniques that are capable of handling large intensity changes. There is thus provided an improved system and method for performing image motion compensation. These and other aspects of the disclosure will be apparent from and elucidated with reference to the embodiment(s) described hereinafter.

BRIEF DESCRIPTION OF THE DRAWINGS

For a better understanding of the embodiments, and to show more clearly how they may be carried into effect, reference will now be made, by way of example only, to the accompanying drawings, in which.

DETAILED DESCRIPTION OF THE EMBODIMENTS

As noted above, there is provided an improved system and method which address the existing problems.

Figure 1:
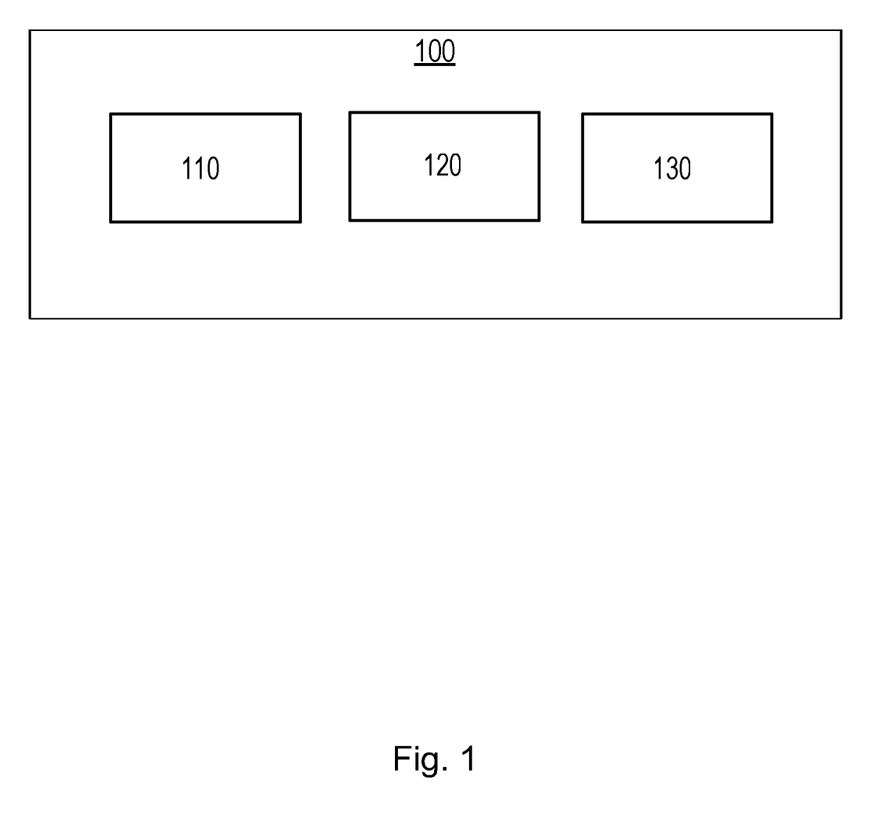
FIG. 1 is a block diagram of a system for performing image motion compensation, according to an embodiment.

FIG. 1 shows a block diagram of a system 100 according to an embodiment, which can be used for performing image motion compensation. The system comprises a light source 110, an imaging unit 120, and a control unit 130.

The light source 110 is configured to provide multiplexed illumination to an object. e.g. the face of a subject, in a plurality of color channels. In more detail, the multiplexed illumination is provided by the light source 110 such that at least one of the plurality of channels is used at a time. In some embodiments, the bandwidth associated with each of the plurality of color channels is within a respective predetermined range. For example, in some embodiments, the light source 110 may have a narrowband spectrum around 450 nm, 520 nm, and 630 nm. Also, in some embodiments, the light source 110 may be configured to provide multiplexed illumination in RGB. By employing color channels that are sufficiently narrow, RGB sensitivity overlap at the imaging unit 120 can be minimized or prevented.

The imaging unit 120 is configured to capture a first image and a second image of the object in the plurality of color channels. The first image is captured at a first point of time during which the illumination is provided by the light source 110 in at least a first color channel, and the second image is captured at a second point of time during which the illumination is provided by the light source 110 in at least the first color channel. In some embodiments, the imaging unit 120 may be a rolling shutter camera. Also, in some embodiments, the imaging unit 120 may be a RGB sensor.

The control unit 130 configured to determine an estimated motion of pixels between the first image and the second image in the first color channel, and to generate a first motion compensated image by extrapolating the estimated motion of pixels between the first image and the second image to at least another one of the plurality of color channels.

In some embodiments, the light source 110 may be configured to provide the illumination such that during the first point of time the illumination is provided in the first color channel and the second color channel, and during the second point of time the illumination is not provided in the second color channel. In these embodiment, the control unit 130 may be configured to generate the first motion compensated image by extrapolating the estimated motion of pixels between the first image and the second image in the first color channel to the second color channel, and to perform ambient light correction based on a difference between the first image and the first motion compensated image in the second color channel.

Furthermore, in these embodiments the light source 110 may be configured to provide the illumination such that during the second point of time the illumination is provided in a third color channel, and the imaging unit 120 may be configured to capture a third image during a third point of time during which the illumination is provided in the third color channel and not provided in the first color channel. In these embodiments, the control unit 130 may be configured to determine an estimated motion of pixels between the second image and the third image in the third color channel, to generate a second motion compensated image by extrapolating the estimated motion of pixels between the second image and the third image in the third color channel to the first color channel, and to perform ambient light correction based on a difference between the second image and the third image in the first color channel.

As mentioned above, in some embodiments the imaging unit 120 may be a rolling shutter camera. In these embodiments, the control unit 130 may be configured to determine an estimated motion of pixels between the first image and the second image in the first color channel based on a first section in the first image and a corresponding second section in the second image. The first and second sections may correspond to an overlap of illumination in the first color channel. In these embodiments, the control unit 130 may be further configured to perform ambient light correction in a third section in the first image and a corresponding fourth section in the first motion compensated image in a second color channel based on a difference between the third and fourth sections, the third section and the fourth section corresponding to an area in which illumination in the second color channel does not overlap. An exemplary related embodiment will be explained in further detail with reference to FIG. 3A and FIG. 3B.

In some embodiments, the control unit 130 may be configured to determine an estimated motion of pixels between the first image and the second image in the first color channel by generating a motion map indicating displacement of one or more pixels in the second image compared to the first image in the first color channel, and to generate the first motion compensated image by extrapolating the motion map to the corresponding one or more pixels in the second image in the at least one of the plurality of color channels. In these embodiments, the control unit 130 may be configured to generate the motion map by tracking displacement of one or more pixels between the first image and the second image using a motion estimation algorithm, e.g. an optical flow algorithm.

To illustrate the operation of the system 100 in more detail, Table 1 is provided below as an example of how different combinations of color channels in RGB are triggered for illumination, for different points of time during which time images are captured.

In this example, the image numbers ("image #") are provided in accordance to the sequence in which the images are captured. Therefore, image #1 is captured during a first point of time, image #2 is captured during a second point of time, and image #3 is captured during a third point of time, so on and so forth, where the first to ninth point of time occur sequentially.

For each of the images #1 to #9, "R" in the respective column indicates that the illumination is provided in the red color channel at the respective point of time during which the image is captured, "G" in the respective column indicates that the illumination is provided in the green color channel at the respective point of time during which the image is captured, and "B" in the respective column indicates that the illumination is provided in the blue color channel at the respective point of time during which the image is captured. For example, image #1 is captured at a first point of time during which the illumination is provided in the red color channel and the blue color channel, and image #2 is captured at a second point of time during which the illumination is provided in the red color channel and the green color channel.

TABLE 1

Sequence of images in the order in which they are captured and the corresponding combination of color channels in which illumination is provided at the respective points of time during which the images are captured

| | Image # | | | | | | | | |
|---|---|---|---|---|---|---|---|---|---|
| | 1 | 2 | 3 | 4 | 5 | 6 | 7 | 8 | 9 |
| RGB | R | R | | R | R | | R | R | |
| | | G | G | | G | G | | G | G |
| | B | | B | B | | B | B | | B |

In this example, motion compensation can be performed based on image #4 and image #5 in the red color channel, since both of these images are captured at points of time during which the illumination is provided in the red color channel. Applying the same logic, motion compensation can also be performed based on image #5 and image #6 in the green color channel, and/or based on image #6 and image #7 in the blue color channel. Subsequent to determining the estimated motion of pixels between two images in a specific color channel, a motion compensated image can be generated by extrapolating the estimated motion of pixels between the two images to the other color channel(s). For example, the estimated motion of pixels between image #4 and image #5 in the red color channel can be extrapolated to the green color channel and the blue color channel to generate motion compensated images Goff, Roff, and Boff, which respectively correspond to the green color channel (even though the associated image is captured at a point of time during which the illumination is not provided in the green color channel, hence "G"+"off"), the red color channel (even though the associated image is captured at a point of time during which the illumination is not provided in the red color channel, hence "R"+"off"), and the blue color channel (even though the associated image is captured at a point in time during which the illumination is not provided in the blue color channel, hence "B"+"off"). Table 2 below shows an updated version of Table 1 subsequent to performing motion compensation based on images #4, image #5, and image #6.

TABLE 2

Sequence of images in the order in which they are captured and the corresponding combination of color channels in which illumination is provided at the respective points of time during which the images are captured, updated with respect to motion compensation being performed based on images #4-6

| | Image # | | | | | | | | |
|---|---|---|---|---|---|---|---|---|---|
| | 1 | 2 | 3 | 4 | 5 | 6 | 7 | 8 | 9 |
| RGB | R | R | | R' | R' | Roff' | R | R | |
| | G | G | G | Goff' | G' | G' | | G | G |
| | B | B | B | B' | Boff' | B' | B | | B |

Based on these motion compensated images, ambient light correction in a specific color channel can be performed by subtracting images corresponding to when illumination is provided in the specific color channel and when illumination is not provided in the specific color channel. For example, ambient light correction in the green color channel can achieved by performing a subtraction operation based on G' (image #5) and Goff' (image 4). Similarly, ambient light correction in the blue color channel can be achieved by performing a subtraction operation based on B' (image #4) and Boff' (image #5), and in the red color channel by performing a subtraction operation based on R' (image #5) and Roff' (image #6).

In general, the control unit 130 can control the operation of the system 100 and can implement the method described herein. The control unit 130 can comprise one or more processors, processing units, multi-core processor or modules that are configured or programmed to control the system 100 in the manner described herein. In particular implementations, the control unit 130 can comprise a plurality of software and/or hardware modules that are each configured to perform, or are for performing, individual or multiple steps of the method described herein.

In some embodiments, the system 100 may further comprise at least one user interface. Alternative or in addition, at least one user interface may be external to (i.e. separate to or remote from) the system 100. For example, at least one user interface may be part of another device. A user interlace may be for use in providing a user of the system 100 with information resulting from the method described herein. Alternatively or in addition, a user interface may be configured to receive a user input. For example, a user interface may allow a user of the system 100 to manually enter instructions, data, or information. In these embodiments, the control unit 130 may be configured to acquire the user input from one or more user interfaces.

A user interface may be any user interface that enables the rendering (or output or display) of information to a user of the system 100. Alternatively or in addition, a user interface may be any user interface that enables a user of the system 100 to provide a user input, interact with and/or control the system 100. For example, the user interface may comprise one or more switches, one or more buttons, a keypad, a keyboard, a touch screen or an application (for example, on a tablet or smartphone), a display screen, a graphical user interface (GUI) or other visual rendering component, one or more speakers, one or more microphones or any other audio component, one or more lights, a component for providing tactile feedback (e.g. a vibration function), or any other user interface, or combination of user interfaces.

In some embodiments, the system 100 may comprise a memory. Alternatively or in addition, one or more memories may be external to (i.e. separate to or remote from) the system 100. For example, one or more memories may be part of another device. A memory can be configured to store program code that can be executed by the control unit 130 to perform the method described herein. A memory can be used to store information, data, signals and measurements acquired or made by the control unit 130 of the system 100. For example, a memory may be used to store (for example, in a local file) the first motion compensated image generated by the control unit 130. The control unit 130 may be configured to control a memory to store the first motion compensated image.

In some embodiments, the system 100 may comprise a communications interface (or circuitry) for enabling the system 100 to communicate with any interfaces, memories and/or devices that are internal or external to the system 100. The communications interface may communicate with any interfaces, memories and/or devices wirelessly or via a wired connection. For example, the communications interface may communicate with one or more user interfaces wirelessly or via a wired connection. Similarly, the communications interface may communicate with the one or more memories wirelessly or via a wired connection.

It will be appreciated that FIG. 1 only shows the components required to illustrate an aspect of the system 100 and, in a practical implementation, the system 100 may comprise alternative or additional components to those shown. It will also be appreciate that although some embodiments and examples have been described with reference to three color channels (RGB), in alternative embodiments more or fewer color channels may be used. For example, in some embodiments, more than three color channels may be used and the imaging unit 120 of the system 100 may be a multispectral camera.

Figure 2:
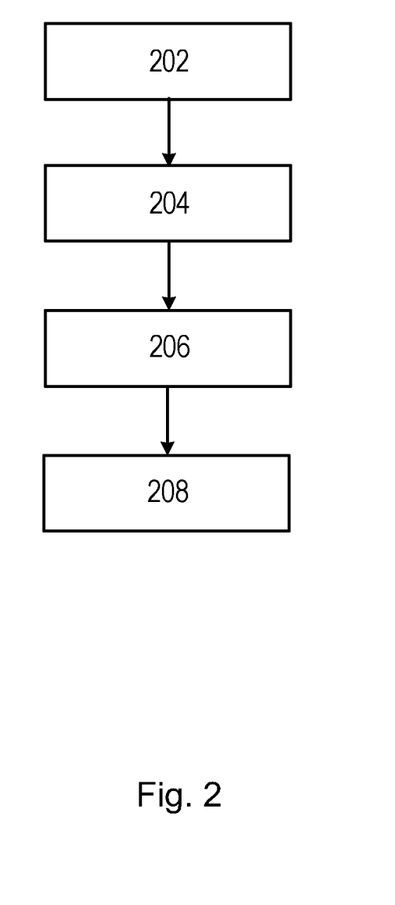
FIG. 2 illustrates a method for performing image motion compensation, according to an embodiment.

FIG. 2 illustrates a method for performing image motion compensation, according to an embodiment. The illustrated method can generally be performed by or under the control of control unit 130 of the system 100. For the purpose of illustration, at least some of the blocks of FIG. 2 will be described with reference to the various components of the system 100 of FIG. 1.

With reference to FIG. 2, at block 202, multiplexed illumination is provided to an object in a plurality of color channels. Specifically, multiplexed illumination may be provided by the light source 110 of the system 100. Specifically, the multiplexed illumination is provided such that at least one of the plurality of channels is used at a time. The bandwidth associated with each of the plurality of color channels may be within a respective predetermined range. The multiplexed illumination may be provided in RGB in some embodiments.

Returning to FIG. 2, at block 204, a first image and a second image are captured in the plurality of color channels. Specifically the first image and the second image may be captured by the imaging unit 120 of the system 100, for example a rolling shutter camera. The first image is captured at a first point of time during which the illumination is provided, by the light source 110, in at least a first color channel, and the second image is captured at a second point of time during which the illumination is provided, by the light source, in at least the first color channel. In some embodiments, at block 204 a third image may be captured during a third point of time.

Returning to FIG. 2, at block 206, an estimated motion of pixels between the first image and the second image in the first color channel is determined. Specifically, the estimation motion of pixels may be determined by the control unit 130 of the system 100.

In some embodiment, where a rolling shutter camera is used for capturing at least the first image and the second image at block 204, at block 206 the determination of the estimated motion of pixels between the first image and the second image in the first color channel may be based on a first section in the first image and a corresponding second section in the second image. 18 these embodiments, the first and second sections may correspond to an overlap of illumination in the first color channel.

In some embodiments, the determination of the estimated motion of pixels between the first image and the second image in the first color channel at block 206 may be performed by generating a motion map indicating displacement of one or more pixels in the second image compared to the first image in the first color channel. Generating the motion map may comprise tracking displacement of one or more pixels between the first image and the second image using a motion estimation algorithm.

Returning to FIG. 2, at block 208, a first motion compensated image is generated, by extrapolating the estimated motion of pixels between the first image and the second image to at least another one of the plurality of color channels. Specifically, the first motion compensated image may be generated by the control unit 130 of the system 100.

As mentioned above, in some embodiments the determination of the estimated motion of pixels between the first image and the second image in the first color channel at block 206 may be performed by generating a motion map indicating displacement of one or more pixels in the second image compared to the first image in the first color channel. Subsequently, in these embodiments the generation of the first motion compensated image at block 208 may be performed by extrapolating the motion map to the corresponding one or more pixels in the second image in the at least one of the plurality of color channels.

In some embodiments, at block 202 during the first point of time the illumination is provided in the first color channel and a second color channel, and during the second point of time the illumination is not provided in the second color channel. In these embodiments, at block 208, generating the first motion compensated image may comprise extrapolating the estimated motion of pixels between the first image and the second image in the first color channel to the second color channel. Furthermore, in these embodiments, the method may further comprise performing ambient light correction based on a difference between the first image and the first motion compensated image in the second color channel.

In some embodiments, during the second point of time the illumination may be provided in a third color channel, and at block 204 a third image may be captured during a third point of time during which the illumination is provided in the third color channel and not provided in the first color channel. In these embodiments, the method may further comprise determining an estimated motion of pixels between the second image and the third image in the third color channel, generating a second motion compensated image by extrapolating the estimated motion of pixels between the second image and the third image in the third color channel to the first color channel, and performing ambient light correction based on a difference between the second image and the third image in the first color channel. These operations may be performed by the control unit 130 of the system.

As mentioned above, in some embodiments where a rolling shutter camera is used for capturing at least the first image and the second image at block 204, at block 206 the determination of the estimated motion of pixels between the first image and the second image in the first color channel may be based on a first section in the first image and a corresponding second section in the second image. In these embodiments, the method may further comprise performing ambient light correction based on a difference between the first image and the first motion compensated image in a second color channel and a third section in the first image and a corresponding fourth section in the first motion compensated image. In these embodiments, the third and fourth sections may correspond to an area in which illumination in the second color channel does not overlap.

Figure 3A:
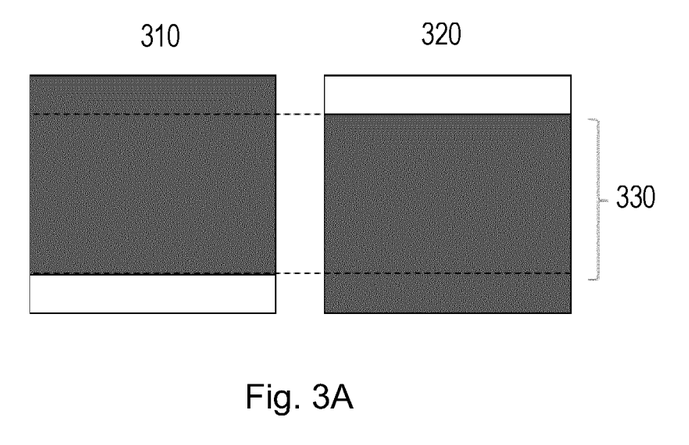
FIG. 3A illustrates a first image and a second image captured using a rolling shutter camera, according an embodiment.
Figure 3B:
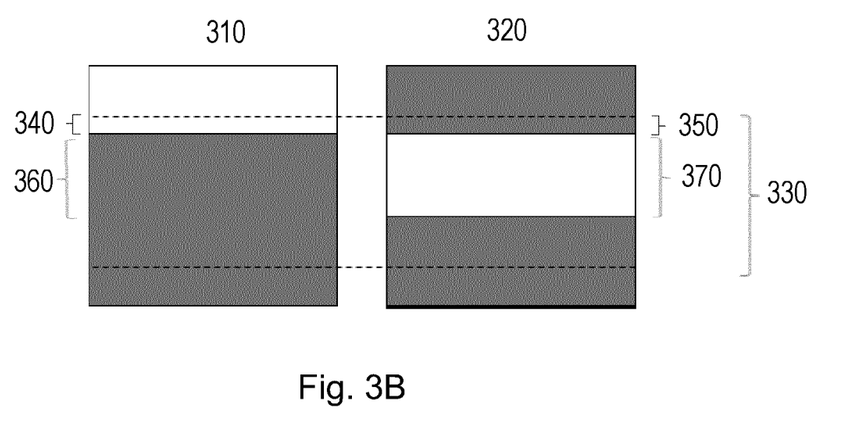
FIG. 3B illustrates the first image and the second image of FIG. 3A.

FIG. 3A and FIG. 3B both illustrate a first image and a second image captured using a rolling shutter camera, according an embodiment. In more detail, in FIG. 3A the first image 310 and the second image 320 are illustrated such that the shaded areas in the respective images represent areas that are illuminated in a first color channel; in FIG. 3B the first image 310 and the second image 320 are illustrated such that the shaded areas in the respective images represent areas that are illuminated in a second color channel.

In the present embodiment, the first image 310 and the second image 320 are images captured consecutively using a rolling shutter camera. Therefore, as shown in FIG. 3A and FIG. 3B, the on-phases and off-phases of the different illumination wavelengths (which corresponds to different color channels) are manifested on the first image 310 and the second image 320 as color bands. In particular, by providing illumination in a specific color channel (e.g. the first color channel) for a sufficiently long time period, a large overlap illumination area in the first and second images 310 and 320 can be achieved.

In this embodiment, an estimated motion of pixels between the first image 310 and the second image 320 can be determined in the first color channel based on the overlap section 330 as illustrated in FIG. 3A. Specifically, the estimated motion of pixels may be determined by generating a motion map indicating displacement of one or more pixels in the second image 320 compared to the first image 310 in the first color channel and in the overlap section 330. The overlap section 330 as labelled in FIG. 3A corresponds to an overlap of illumination in the first color channel of the first and second images 310, 320. The determination of the estimated motion of pixels between the first image 310 and the second image 320 may be determined by the control unit 130 of the system.

Subsequently, a partially motion compensated image can be generated by extrapolating the estimated motion of pixels between the first image 310 and the second image 320 to at least the second color channel for the overlap section 330.

Once the estimated motion of pixels between the first image 310 and the second image 320 in the first color channel is determined, and the partially motion compensated image is generated, ambient light correction can be performed in a third section in the first image and a corresponding fourth section in the motion compensated image, wherein the third and fourth sections correspond to an area in which illumination in the second color channel does not overlap. In this embodiment, ambient light correction can be performed for a sub-section within the overlap section 330, based on a difference between at least a sub-section in the overlap section 330 Specifically, subsequent to compensating for motion in the first image 310 and/or the second image 320 at least in the overlap section 330, ambient light correction can be performed for a sub-section in the first image 310 which corresponds to an area illuminated by light in the second color channel and a sub-section in the second image 320 which corresponds to an area not illuminated by light in the second color channel. For example, the non-illuminated sub-section 340 in the first image 310 as labelled in FIG. 3B can be regarded as the third section in the present context, and the illuminated sub-section 350 in the second image 320 can be regarded as the fourth section in the present context, as this illuminated sub-section 350 in the second image 320 positionally corresponds to the non-illuminated sub-section 340 in the first image 310.

As another example, ambient light correction can also be performed based on the illuminated sub-section 360 in the first image 310 as labelled in FIG. 3B and the non-illuminated sub-section 370 in the second image 320, as this non-illuminated sub-section 370 in the second image 320 positionally corresponds to the illuminated sub-section 360 in the first image 310. In this context, the illuminated sub-section 360 may be regarded as the third section while the non-illuminated sub-section 370 may be regarded as the fourth section.

In some embodiments, ambient light correction may be performed section-by-section. For example, ambient light correction in the second color channel may be performed based on non-illuminated sub-section 340 and illuminated sub-section 350 to achieve the desired correction results at the corresponding part of the image, and subsequently ambient light correction in the second color channel may be performed based on illuminated sub-section 360 and non-illuminated sub-section 370 at the corresponding part of the image. The rest of the image can be corrected for ambient light in a similar manner.

There is thus provided an improved system and method for performing image motion compensation, which overcomes the existing problems.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A system for performing image motion compensation, the system comprising:
a light source configured to provide multiplexed illumination to an object in a plurality of color channels, wherein the multiplexed illumination is provided such that at least one of the plurality of color channels is used at a time;
an imaging unit configured to capture a first image and a second image of the object in the plurality of color channels, wherein the first image is captured at a first point of time during which the multiplexed illumination is provided in at least a first color channel, and the second image is captured at a second point of time during which the multiplexed illumination is provided in at least the first color channel; and
a controller configured to:
determine an estimated motion of pixels between the first image and the second image in the first color channel; and
generate a first motion compensated image by extrapolating the estimated motion of pixels between the first image and the second image to at least another one of the plurality of color channels.

2. The system according to claim 1, wherein:
during the first point of time, the multiplexed illumination is provided in the first color channel and a second color channel,
during the second point of time, the multiplexed illumination is not provided in the second color channel, and
the controller is further configured to:
generate the first motion compensated image by extrapolating the estimated motion of pixels between the first image and the second image in the first color channel to the second color channel; and
perform ambient light correction based on a difference between the first image and the first motion compensated image in the second color channel.

3. The system according to claim 2, wherein:
during the second point of time, the multiplexed illumination is provided in a third color channel,
the imaging unit is further configured to capture a third image during a third point of time during which the multiplexed illumination is provided in the third color channel and not provided in the first color channel, and
the controller being further configured to:
determine an estimated motion of pixels between the second image and the third image in the third color channel;
generate a second motion compensated image by extrapolating the estimated motion of pixels between the second image and the third image in the third color channel to the first color channel; and
perform ambient light correction based on a difference between the second image and the third image in the first color channel.

4. The system according to claim 1, wherein the imaging unit is a rolling shutter camera, and the controller is further configured to determine the estimated motion of pixels between the first image and the second image in the first color channel based on a first section in the first image and a corresponding second section in the second image, wherein the first section and the corresponding second section correspond to an overlap of illumination in the first color channel.

5. The system according to claim 4, wherein the controller is further configured to perform ambient light correction in a third section in the first image and a corresponding fourth section in the first motion compensated image in a second color channel based on a difference between the third section and the corresponding fourth section, wherein the third section and the corresponding fourth section correspond to an area in which illumination in the second color channel does not overlap.

6. The system according to claim 1, wherein the controller is further configured to determine the estimated motion of pixels between the first image and the second image in the first color channel by generating a motion map indicating displacement of one or more pixels in the second image compared to the first image in the first color channel, and to generate the first motion compensated image by extrapolating the motion map to corresponding one or more pixels in the second image in the at least one of the plurality of color channels.

7. The system according to claim 6, wherein generating the motion map comprises tracking displacement of one or more pixels between the first image and the second image using a motion estimation algorithm.

8. The system according to claim 1, wherein a bandwidth associated with each of the plurality of color channels is within a respective predetermined range.

9. The system according to claim 1, wherein the light source is configured to provide multiplexed illumination in red-green-blue (RGB), and the imaging unit is a RGB sensor.

10. The system according to claim 1, wherein the controller further comprises one or more processors, processing units, and/or multi-core processor or modules.

11. The system according to claim 10, wherein the controller further comprises a plurality of software modules and/or hardware modules.

12. A method for performing image motion compensation, the method comprising:
 providing multiplexed illumination to an object in a plurality of color channels, wherein the multiplexed illumination is provided such that at least one of the plurality of color channels is used at a time;
 capturing a first image and a second image of the object in the plurality of color channels, wherein the first image is captured at a first point of time during which the multiplexed illumination is provided in at least a first color channel, and the second image is captured at a second point of time during which the multiplexed illumination is provided in at least the first color channel;
 determining an estimated motion of pixels between the first image and the second image in the first color channel; and
 generating a first motion compensated image by extrapolating the estimated motion of pixels between the first image and the second image to at least another one of the plurality of color channels.

13. The method according to claim 12, wherein:
 during the first point of time, the multiplexed illumination is provided in the first color channel and a second color channel,
 during the second point of time, the multiplexed illumination is not provided in the second color channel,
 the step of generating the first motion compensated image comprises extrapolating the estimated motion of pixels between the first image and the second image in the first color channel to the second color channel, and
 the method further comprises:
  performing ambient light correction based on a difference between the first image and the first motion compensated image in the second color channel.

14. The method according to claim 13, wherein during the second point of time, the multiplexed illumination is provided in a third color channel, and the method further comprises:
 capturing a third image during a third point of time during which the multiplexed illumination is provided in the third color channel and not provided in the first color channel;
 determining an estimated motion of pixels between the second image and the third image in the third color channel;
 generating a second motion compensated image by extrapolating the estimated motion of pixels between the second image and the third image in the third color channel to the first color channel; and
 performing ambient light correction based on a difference between the second image and the third image in the first color channel.

15. The method according to claim 12, wherein the step of determining the estimated motion of pixels between the first image and the second image in the first color channel is based on a first section in the first image and a corresponding second section in the second image, wherein the first section and the corresponding second section correspond to an overlap of illumination in the first color channel.

16. The method according to claim 15, further comprising performing ambient light correction in a third section in the first image and a corresponding fourth section in the first motion compensated image in a second color channel based on a difference between the third section and the corresponding fourth section, wherein the third section and the corresponding fourth section correspond to an area in which illumination in the second color channel does not overlap.

17. The method according to claim 12, wherein the step of determining the estimated motion of pixels between the first image and the second image in the first color channel comprises generating a motion map indicating displacement of one or more pixels in the second image compared to the first image in the first color channel, and wherein the step of generating the first motion compensated image comprises extrapolating the motion map to corresponding one or more pixels in the second image in the at least one of the plurality of color channels.

18. The method according to claim 17, wherein generating the motion map comprises tracking displacement of one or more pixels between the first image and the second image using a motion estimation algorithm.

19. The method according to claim 12, wherein a bandwidth associated with each of the plurality of color channels is within a respective predetermined range.

20. The method according to claim 12, wherein a light source is configured to provide multiplexed illumination in red-green-blue (RGB), and an imaging unit is a RGB sensor.

* * * * *